(No Model.)

T. C. COLLINS.
CANE STRIPPER.

No. 374,777. Patented Dec. 13, 1887.

Witnesses
Henry G. Dieterich
R. W. Bishop

Inventor
T. C. Collins
By his Attorneys

UNITED STATES PATENT OFFICE.

THOMAS C. COLLINS, OF WESSON, MISSISSIPPI.

CANE-STRIPPER.

SPECIFICATION forming part of Letters Patent No. 374,777, dated December 13, 1887.

Application filed July 14, 1886. Serial No. 208,011. (No model.)

*To all whom it may concern:*

Be it known that I, THOMAS C. COLLINS, a citizen of the United States, residing at Wesson, in the county of Copiah and State of Mississippi, have invented certain new and useful Improvements in Cane-Strippers; and I do hereby declare the following to be a full, clear, and exact description of the same.

My invention relates to improvements in cane-strippers, and aims to provide a device which will be simple in construction and efficient in operation, as hereinafter first fully described, and then pointed out in the claims.

Figure 3:
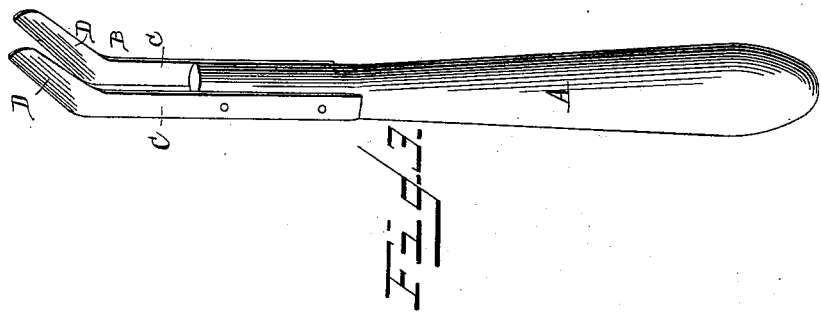
Figure 2:
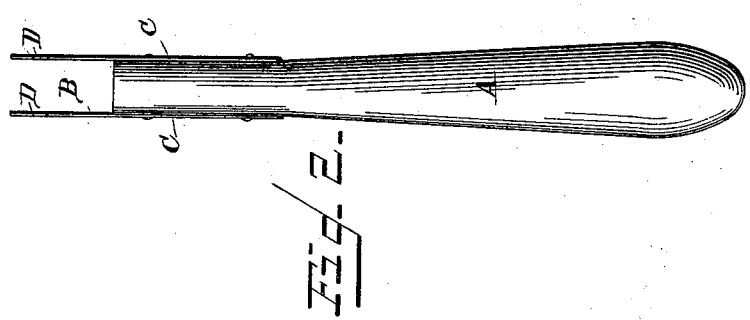
Figure 1:
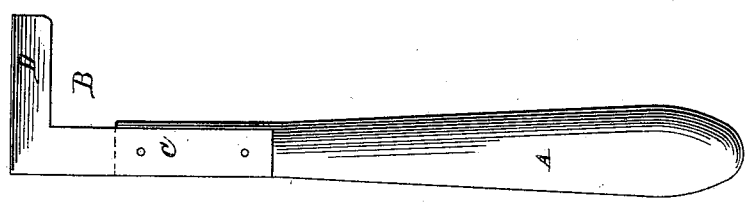

In the accompanying drawings, Figure 1 is a side elevation of my improved device. Fig. 2 is a plan view of the same, and Fig. 3 is a perspective view showing a modified form of blades.

Referring to the drawings by letter, A designates the handle of my improved implement, which may be of any desired size or shape, but is preferably of the approximately cylindrical shape shown in the drawings. At one end of this handle, on diametrically-opposite sides thereof, I secure by rivets or otherwise two spring-blades, B, each consisting of the arm C, extending from the handle in the line of the same, and the arm D at right angles to the arm C and integral therewith. These L-shaped blades I make out of thin spring-steel, thereby combining the three requisites of strength, lightness, and cheapness. In the form of blade shown in Fig. 3, the arm D is formed integral with the arm C, but at an obtuse angle thereto. Good results are obtained from the use of this form of blade; but I prefer the L-shaped blades shown in the other figures.

In operation the device is grasped by the handle and passed rapidly along the stalk, with the short arms D of the blades extending downward. The leaves and twigs are thus caught in the angles of the blades and stripped from the stalk. The blades will take their positions on opposite sides of the stalk, and will thus entirely strip all the leaves and twigs therefrom, and being made of thin spring-steel they will automatically adjust themselves to the thickness of the stalk. The blades, also, will not have any ground cutting-edges, and so will not require constant grinding and sharpening, as the blades will be so thin that their natural edges will be sufficiently sharp to answer all purposes for which the device is intended.

My device, it will be readily seen, is extremely simple in construction, and can be readily operated by the most inexperienced person.

Having thus described my invention, what I claim, and desire to secure by Letters Patent, is—

1. A cane-stripper comprising a handle and a pair of thin spring-blades secured to the end thereof, substantially as set forth.

2. A cane-stripper comprising a handle and a pair of L-shaped thin spring-blades secured to one end of the same, substantially as specified.

June 17, A. D. 1886.

THOMAS C. COLLINS.

Witnesses:
 EUGENE B. WIMBERLY,
 TOM S. HAYNIE.